Nov. 17, 1931.  H. E. CURTIS  1,832,188
MOTOR VEHICLE
Filed May 11, 1929
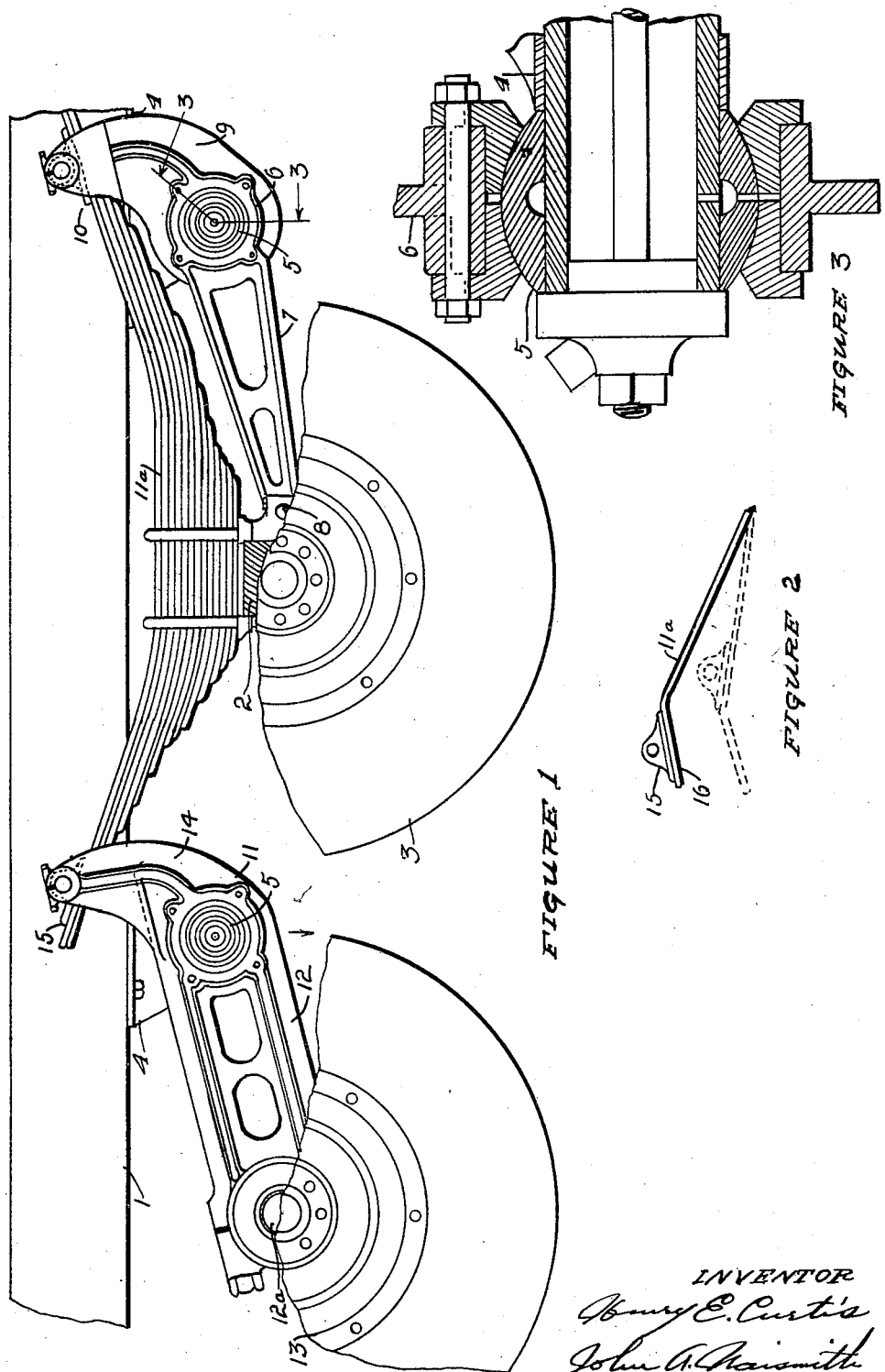

Patented Nov. 17, 1931

1,832,188

UNITED STATES PATENT OFFICE

HENRY E. CURTIS, OF SAN JOSE, CALIFORNIA, ASSIGNOR OF ONE-HALF TO JOHN H. BETTS, OF LONG BEACH, CALIFORNIA

MOTOR VEHICLE

Application filed May 11, 1929. Serial No. 362,209.

This invention relates particularly to motor truck construction wherein the usual four wheel chassis is supplemented by an extra pair of wheels for carrying extra heavy loads.

It is one object of the invention to provide a construction whereby the additional pair of wheels may be added to a truck with a minimum amount of labor and mechanical changes and adjustments.

It is another object of the invention to provide a construction of the character indicated wherein the additional pair of wheels are subjected to substantially the same fluctuating forces as the truck wheels with which they are associated.

It is still another object to provide a construction wherein the extra wheels and the wheels with which they are associated cooperate to carry the load smoothly and evenly over uneven surfaces.

It is also an object to provide a structure of the character indicated that will be economical to manufacture, quickly and easily assembled and disassembled, strong, durable, and highly efficient in its practical application.

In the drawings:

Figure 1 is a side elevation of a structure embodying my invention, parts broken away.

Figure 2 is a diagram illustrating a modified form of the invention.

Figure 3 is an enlarged sectional view on line 3—3 of Figure 1.

In the embodiment of the invention herein disclosed a portion of the vehicle frame is shown at 1 and the axle is indicated at 2, a wheel being indicated at 3.

At 4—4 are shown brackets mounted on frame 1 and equally spaced from the axle on opposite sides thereof and carrying bearings as 5.

On the forward bearing 5 is mounted a lever as 6 having a long arm 7 pivotally connected to the axle as at 8 and having an upwardly extending short arm 9 carrying a shoe 10. A spring 11a is mounted on the axle with its forward end underlying the shoe 10 and having a sliding engagement therewith, the rearwardly extending part of the spring being shorter than the forwardly extending portion as shown.

On the rear bearing 5 is mounted a lever as 11 having its longer arm 12 extending rearwardly to engage an axle 12a carrying a wheel 13. The short arm 14 of the lever extends upwardly and has a shoe 15 mounted thereon which slidably engages the adjacent end of the spring 11a.

The load is applied first through the bearings 5 and thence through the lever arms 7 and 12 to wheels 3 and 13, and through lever arms 9 and 14 to the opposite ends of the spring 11a, and through the spring to the wheel 3.

By means of this construction the normal action of the spring is to maintain the wheels in contact with the ground since its upward thrust would tend to swing the long arms of the lever downwardly, and of course this force increases as the load on bearings 5 increases. Since the levers have sliding engagement with the spring ends any vertical movement of one wheel relative to the other will cause a pivotal movement of the lever upon which it is mounted and thereby cause it to shorten or lengthen the working length of the spring, as the case may be. For instance, an upward movement of wheel 13 relative to wheel 3, will cause the shoe 15 to advance on the spring 11a shortening the working length of the spring and consequently increasing its resistance.

If it is desired to change from the four wheel type of construction as disclosed in my copending application, Serial Number 362,208, filed concurrently herewith, to the six wheel type disclosed herein, it is only necessary to substitute the lever 11 and the parts carried thereby and the spring 11a for the spring and rear lever of the above named application.

With the spring 11a terminating in straight ends it may happen that an excessive relative movement between the wheels may cause the shoe 15 to ride off of the spring. This is effectually prevented by turning the end downwardly as indicated at 16, in which case the shoe will always seat upon the spring although the pivotal movement of the lever 11 be excessive.

It is to be understood, of course, that while I have herein shown and described the preferred embodiment of the invention, changes in form, construction, and method of assembly and operation may be made within the scope of the appended claims.

I claim:

1. In a motor vehicle, an axle, a frame mounted thereover, a spring mounted on the axle, a rocker arm mounted on the frame and having sliding engagement with the spring at one end whereby to vary the effective working length of the spring upon relative movement between the frame and axle, and means for journaling a wheel in the other end of the rocker arm.

2. In a motor vehicle, an axle, a spring thereon, a frame positioned thereover, bearings mounted on the frame equidistant from the axle and on opposite sides thereof, and similarly disposed levers mounted on the bearings, one lever being pivotally connected to the axle and having shiftable connection with one end of the spring, and the other lever being adapted to support a wheel and having shiftable connection with the other end of the spring.

3. In a motor vehicle, an axle, a spring thereon, a frame positioned thereover, bearings mounted on the frame on either side of the axle, and similarly disposed levers mounted on the bearings, one lever being pivotally connected to the axle and having shiftable connection with one end of the spring, and the other lever having a long arm adapted to support a wheel and an upwardly extending short arm adapted to shiftably engage the other end of the spring.

4. In a motor vehicle, an axle, a spring thereon, a frame overlying the axle, and similarly disposed levers fulcrumed on the frame on opposite sides of the axle, one lever being pivotally connected to the axle and connected to one end of the spring, and the other lever being connected to the other end of the spring and provided with wheel supporting means.

5. In a motor vehicle, a frame, an axle, a spring supported on said axle, and means journaled on said frame having one end slidably engaged with said spring and having its opposite end provided with wheel supporting means.

6. In a motor vehicle, a frame, an axle, a spring supported on said axle, a lever journaled on said frame, means carried by one end of the lever for slidably engaging said spring, and wheel supporting means carried by the opposite end of the lever.

7. In a motor vehicle, a frame, an axle, a semielliptical spring supported on said axle, a lever journaled on said frame having one end connected to the axle and having its opposite end slidably engaged with one end of the spring, a second lever journaled on the frame having one of its ends engaged with the opposite end of the spring, and wheel supporting means carried by the opposite end of the second named lever.

HENRY E. CURTIS.